US00RE43519E

(19) United States
(12) Reissued Patent
Gnecco et al.

(10) Patent Number: US RE43,519 E
(45) Date of Reissued Patent: Jul. 17, 2012

(54) ELECTROMAGNETICALLY PROTECTED HEARING AIDS

(75) Inventors: Louis T. Gnecco, Vienna, VA (US); Paula S. Gnecco, Vienna, VA (US)

(73) Assignee: Acacia Patent Acquisition Corporation, Newport Beach, CA (US)

(21) Appl. No.: 11/099,518

(22) Filed: Apr. 8, 2005

Related U.S. Patent Documents

Reissue of:
(64) Patent No.: 6,546,109
Issued: Apr. 8, 2003
Appl. No.: 09/476,131
Filed: Jan. 3, 2000

U.S. Applications:
(63) Continuation-in-part of application No. 08/835,350, filed on Apr. 7, 1997, now Pat. No. 6,031,923, which is a continuation-in-part of application No. 08/557,999, filed on Nov. 13, 1995, now Pat. No. 5,640,457.

(51) Int. Cl.
*H04R 25/00* (2006.01)
(52) U.S. Cl. ..... 381/322; 381/328; 174/353
(58) Field of Classification Search ..... 381/312, 381/322, 324, 328, 330, 189; 361/816, 818, 361/328, 306.3; 174/350, 353; 455/100, 455/350, 352, 575.5, 300
See application file for complete search history.

(56) References Cited

U.S. PATENT DOCUMENTS

| | | | | |
|---|---|---|---|---|
| 1,712,026 A | | 5/1929 | Clark | 455/280 |
| 1,805,942 A | | 5/1931 | Ferris | 455/280 |
| 1,943,405 A | | 1/1934 | Wheeler | 455/280 |
| 2,327,320 A | | 8/1943 | Shapiro | 381/69.1 |
| 2,617,926 A | | 11/1952 | Cohen | 455/280 |
| 3,587,017 A | | 6/1971 | Kurusu | 455/280 |
| 3,852,540 A | | 12/1974 | Diethelm | |
| 4,532,930 A | | 8/1985 | Crosby et al. | 128/419 |
| 4,805,232 A | | 2/1989 | Ma | 455/280 |
| 4,956,868 A | | 9/1990 | Carlson | 381/322 |
| 5,500,629 A | | 3/1996 | Meyer | 333/181 |
| 5,640,457 A | | 6/1997 | Gnecco et al. | 381/322 |
| 5,657,199 A | * | 8/1997 | Devoe et al. | 361/328 |
| 5,708,720 A | | 1/1998 | Meyer | 381/322 |
| 5,796,848 A | | 8/1998 | Martin | |

(Continued)

FOREIGN PATENT DOCUMENTS

DE 4011438 A1 10/1991

(Continued)

OTHER PUBLICATIONS

"EMC For Product Designers", Butterworth-Heinemann Ltd. 1992, pp. 4-5, 10-11, 122-139, 147-150, 155-158, 166-169, 182-185, 194-195, 199-212.

(Continued)

*Primary Examiner* — Huyen D Le
(74) *Attorney, Agent, or Firm* — Martin & Ferraro, LLP

(57) ABSTRACT

A Behind The Ear, In The Ear, All in The Ear, In The Canal, or Completely In The Canal hearing aid which is made resistant to electromagnetic interference produced by cellular telephones in the 800 MHz to 100 GHz frequency range. The resultant hearing aid will allow hearing impaired people to take advantage of cellular telephones and other recently-developed personal communication devices while also using their hearing aids.

12 Claims, 9 Drawing Sheets

U.S. PATENT DOCUMENTS

| | | | | |
|---|---|---|---|---|
| 5,809,151 | A | 9/1998 | Husung | 381/312 |
| 6,031,923 | A | 2/2000 | Gnecco et al. | 381/322 |
| 6,104,821 | A * | 8/2000 | Husung | 381/312 |
| 6,546,109 | B1 | 4/2003 | Gnecco et al. | 381/322 |

FOREIGN PATENT DOCUMENTS

| | | |
|---|---|---|
| DE | 43 43 703 C1 | 1/1995 |
| JP | 4 271398 | 9/1992 |

OTHER PUBLICATIONS

Joyner, et al., "Interference to Hearing Aids by the new Digital Mobile Telephone System, Global System for Mobile (GSM) Communications Standard," published by National Acoustic Laboratories, Mar. 30, 1993; pp. 1-15.

LeStrange, R. et al., "Interference to Hearing Aids by the new Digital Mobile Telephone System, Global System for Mobile (GSM) Communications Standard", published by National Acoustic Laboratories, NAL Report No. 131, May 1995, pp. i-x, 1-109.

Oticontact Newsletter, No. 13, Oct. 1993, pp. 1-2.

Office Action dated Apr. 3, 2008 for related co-pending Reexamination Control. No. 90/008,600.

Office Action dated Apr. 3, 2008 in related copending Reexamination Control No. 90/008,600.

Order Granting Ex Parte Reexamination dated Sep. 1, 2007 in related copending Reexamination Control No. 90/008,600.

Order Granting Ex Parte Reexamination dated Nov. 6, 2007 in related copending Reexamination Control No. 90/008,607.

Machine translation in English of Mueller et al. (DE 4011438 A1).

Request for Ex Parte Reexamination of U.S. Patent No. 6,031,923; dated Apr. 19, 2007; pp. 1-28.

Reply by Third Party Requester to Patent Owner's Statement Dated Nov. 1, 2007 from Ex Parte Reexamination Control No. 90/008,600; Dec. 28, 2007; pp. 1-8.

Notice of Intent to Issue Ex Parte Reexamination Certificate from Ex Parte Reexamination Control No. 90/008,600; mailed Feb. 12, 2009; 9 pages.

Request for Ex Parte Reexamination of U.S. Patent No. 5,640,457; dated Apr. 19, 2007; pp. 1-21.

Reply by Third Party Requester to Patent Owner's Statement Dated Jan. 7, 2007 from Ex Parte Reexamination Control No. 90/008,607; Mar. 7, 2008; pp. 1-7.

Office Action mailed Sep. 19, 2008 from Ex Parte Reexamination Control No. 90/008,607; 20 pages.

Final Office Action mailed Mar. 18, 2009 from Ex Parte Reexamination Control No. 90/008,607; 22 pages.

Notice of Intent to Issue Ex Parte Reexamination Certificate from Ex Parte Reexamination Control No. 90/008,607; mailed Jul. 14, 2009; 8 pages.

Ex Parte Reexamination Certificate No. US 6,031,923 C1; issued Apr. 21, 2009; 2 pages.

Ex Parte Reexamination Certificate No. US 5,640,457 C2; Issued Nov. 3, 2009; 2 pages.

* cited by examiner

ELECTROMAGNETICALLY PROTECTED HEARING AIDS

Matter enclosed in heavy brackets [ ] appears in the original patent but forms no part of this reissue specification; matter printed in italics indicates the additions made by reissue.

CROSS REFERENCES TO RELATED APPLICATIONS

This application is a continuation-in-part of [pending] application Ser. No. [08,835,350: "Electromagnetically Shielded Hearing Aid"] *08/835,350, filed Apr. 7, 1997, now U.S. Pat. No. 6,031,923, which is a continuation-in-part of application Ser. No. 08/557,999, filed Nov. 13, 1995, now U.S. Pat. No. 5,640,457.*

REFERENCE TO "MICROFICHE APPENDIX"

None

This invention was not made under any Federally sponsored research and development program.

BACKGROUND OF THE INVENTION

1. Field of the Invention

This invention relates to hearing aids, and specifically to Behind The Ear, In The Ear, In The Canal, or Completely In The Canal hearing aids which are being shielded to be resistant to electromagnetic interference produced by cellular telephones and other devices in the 800 MHz to 100 GHz frequency range.

2. Description of Related Art

The invention consists of the following: hearing aids which can be worn behind the ear, in the ear, or in the ear canal. These devices are widely known in the hearing aid industry as follows: Behind The Ear (BTE), In The Ear or All In The Ear (ITE), In The Canal (ITC), and Completely In The Canal (CIC).

This invention intends to shield these types of hearing aids from electromagnetic interference caused by cellular telephones in the 800 MHz-100 GHz frequency range by using an electrically conductive foil to shield the circuitry components. Furthermore, an electrically conductive gasket, paint or plastic could also be used to shield the circuitry components.

Also, a filtering circuit composed of inductors and capacitors is used to shield the circuitry components wherein ferrite beads or ferrite toroids are used as the inductors.

Also, a case consisting of a faceplate and a shell, the shell being made to fit in the ear, partially in the ear canal, or completely in the ear canal, and made wholly or partially of an electrically conductive material, the outside of which consists of a material such as an acrylic that produces no adverse affects when worn in the ear by most people.

The following devices are related to, but do not comprise any part of this invention: hearing aids worn elsewhere on the body other than in or behind the ear, known as "Body Aids", aids which intentionally use an electric field antenna or a plane wave antenna, hearing aids which couple sound waves through the bones of the head, known as "Bone Conduction" hearing aids, and also hearing aids which are built into eyeglass frames, and any devices which require surgery to install, such as Cochlear Implants.

DESCRIPTION OF PRIOR ART

FIG. 5 (Prior Art) Illustrates the elements which comprise a hearing aid. A Behind The Ear hearing aid is used for the illustration, but the same components are found in other hearing aids wherein the only difference could be the shape or size.

FIG. 5 (Prior Art) shows a hearing aid consists of an outer case 1, usually made of plastic such as Lucite (Poly Methyl Methacrylate), Non-Toxic Lucite, Poly Ethyl Methacrylate, Poly Vinyl Chloride, Silicone, or Polyethylene.

The case 1 houses and protects the internal circuitry components. The hearing aid has a battery door 3 which can be opened to replace the battery, an opening for a microphone 5, an opening for the speaker or receiver 6, and an opening for the volume control knob 7. The case 1 often has switches and controls, such as an optional telecoil pickup switch which couples the hearing aid electromagnetically to a telephone handset. The internal components 2 also consist of amplifiers and signal conditioning circuits as shown in the block diagram. These circuits contain non linear elements such as transistors. Some of the internal components are coupled by fine internal wires 10.

Besides all these openings as disclosed above, In The Ear, In The Canal, or Completely In The Canal hearing aids have a vent hole (not shown) to prevent the buildup of air pressure and moisture in the ear canal. This vent hole goes completely through the hearing aid. To build an effective hearing aid, one requires several openings due to current technology. Today's hearing aid users are adversely affected by radio signals that are produced by cellular telephones and other devices in the 800 MHz to 100 GHz frequency range. These signals are often pulse modulated at rates of 200 Hz to 300 Hz. Conventional hearing aids can unintentionally act as radio receivers, with their internal wires 10 acting as unintentional antennas, and their nonlinear elements unintentionally acting as detection and demodulating circuits. This causes the hearing aid to produce annoying or intolerable sounds, such as a 200 Hz to 300 Hz hum.

Shapiro (U.S. Pat. No. 2,327,320) teaches a body-hearing aid with a shield against electromagnetic interference which undoubtedly is only effective for low frequency sources of electromagnetic interference such as motors, hair dryers, and possibly fluorescent lights. It should be noted that this shield would not be effective against the current ultra-high frequency signals being experienced by today's hearing aid users. Ferrite beads and transistors were not available at this time and therefore, current circuitry components can not be shielded by the methods disclosed by Shapiro.

SUMMARY OF THE INVENTION

The invention consists of the following hearing aids which can be worn behind the ear, in the ear, or in the ear canal, these devices are widely known in the hearing aid industry as follows: Behind The Ear (BTE), In The Ear or All In The Ear (ITE), In The Canal (ITC), and Completely In The Canal (CIC). In this document, the phrase "hearing aid worn in the ear" refers to ITE, ITC, and CIC hearing aids.

This invention intends to shield these types of hearing aids from electromagnetic interference caused by cellular telephones in the 800 MHz-100 GHz frequency range by using an electrically conductive foil to shield the circuitry components. Furthermore, an electrically conductive gasket, paint or plastic could also be used to shield the circuitry components.

Also, a filtering circuit composed of inductors and capacitors is used to shield the circuitry components wherein ferrite beads or ferrite toroids are used as the inductors.

Also, a hearing aid worn in the ear consisting of a face plate and a shell, each made wholly or partly of a conductive material, and made in such a way that none of the conductive material comes in contact with the ear when the hearing aid is worn.

DETAILED DESCRIPTION

Figure 7:
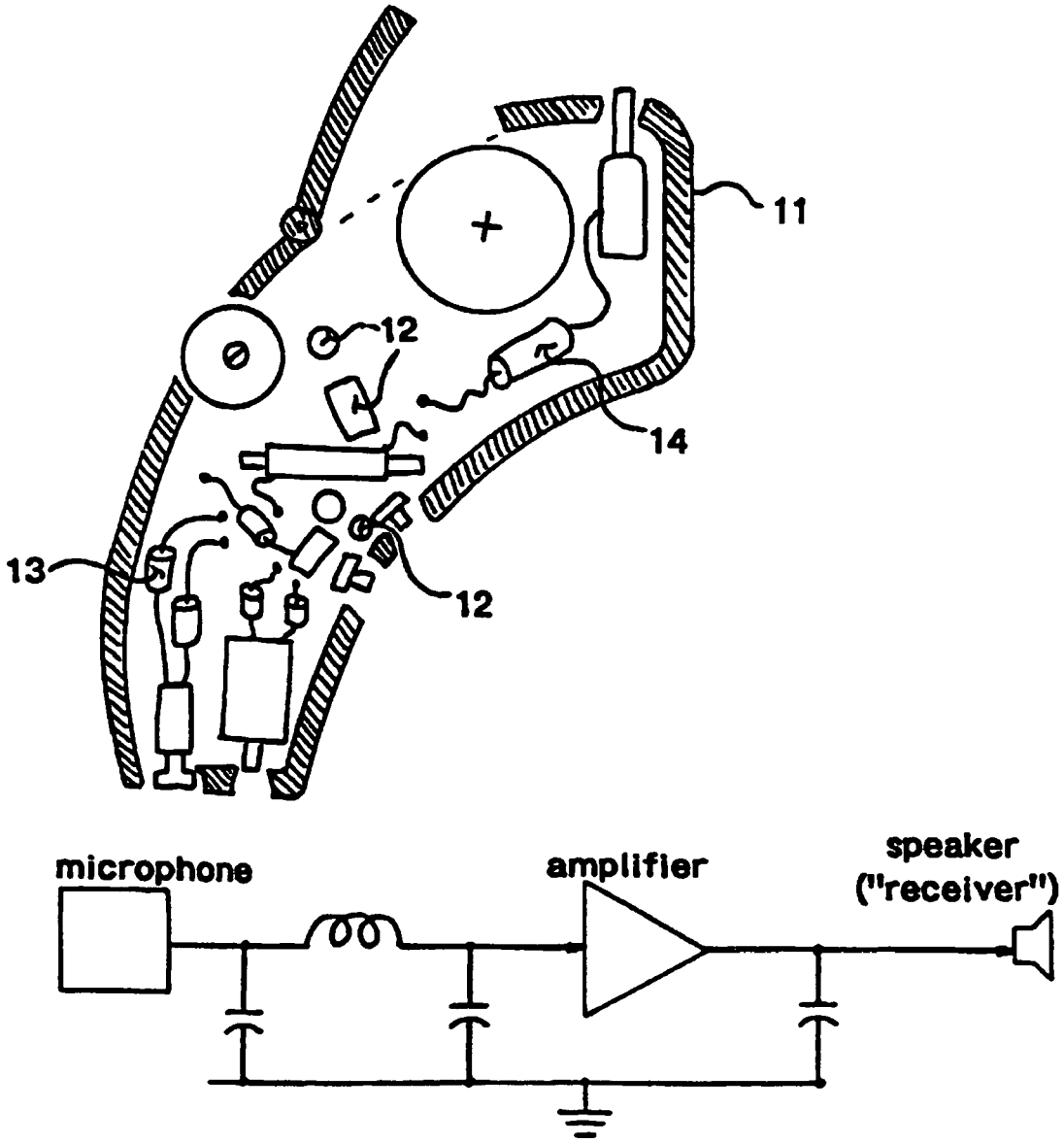
FIG. 7 describes the invention.
Figure 8:
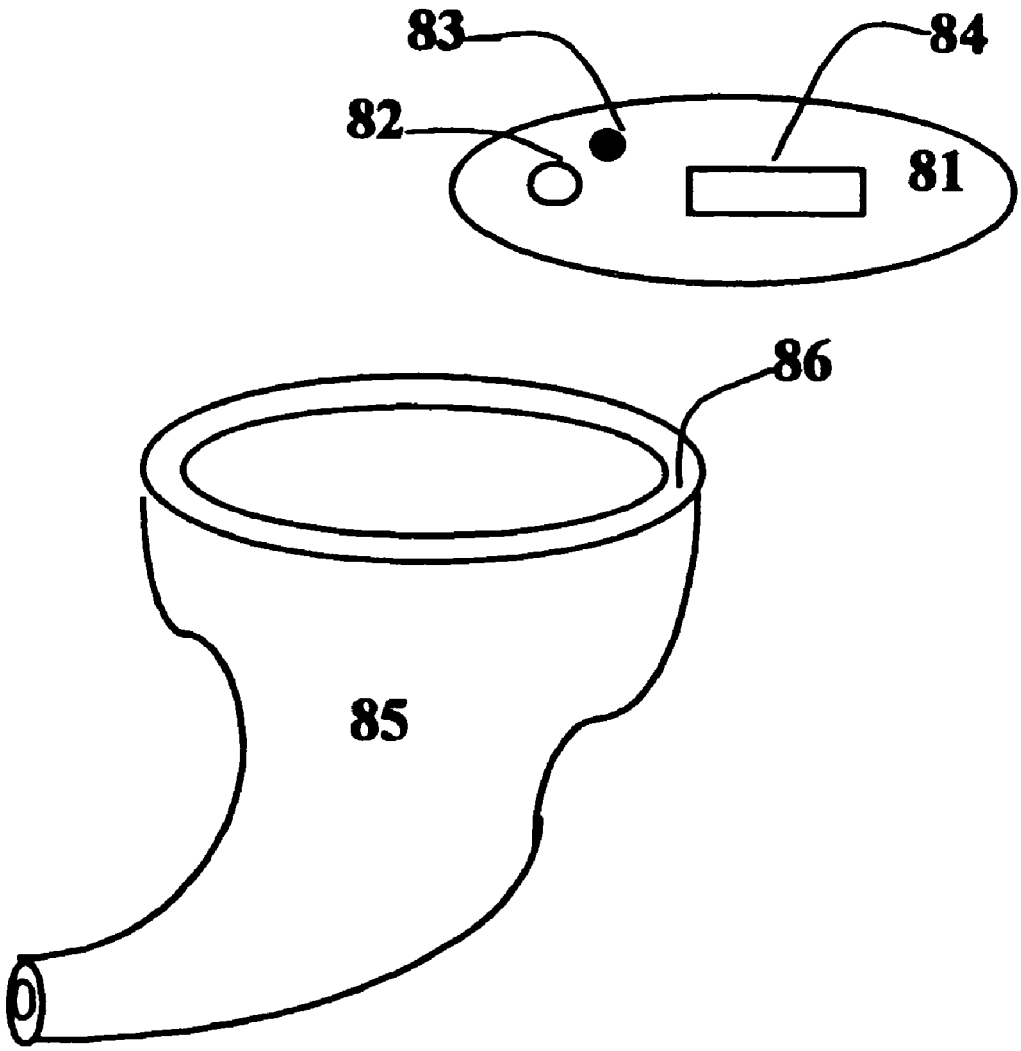
FIG. 8 shows the details of an electromagnetically shielded In The Ear hearing aid consisting of a face plate 81 and a shell 85.
Figure 9:
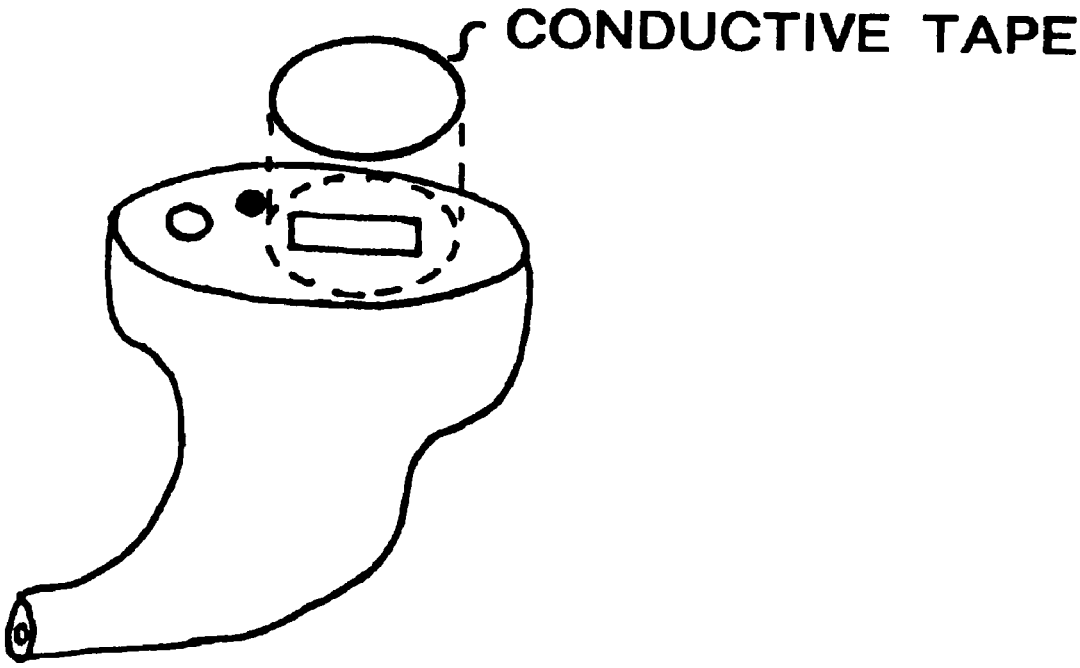
FIG. 9 shows the face plate 91 and the shell 95 after final assembly.

The invention, shown in FIGS. 7, 8 and 9 consists of the following elements: an outer case 11, which holds and protects the internal components 12 and is shielded by one or more of the following:

11a: Painting the case with a conductive coating, usually a paint which is filled with silver, nickel, or copper, such as the following products made by Chomerics, Inc. of Woburn Massachusetts: "Cho-Shield 596" or "Cho-Flex 601."

11b: Lining the case with an electrically conductive material such as conductive foil, usually copper or aluminum foil, such as "Cho-foil" produced by Chomerics, Inc.

11c. Making the case out of a conductive material, such as a plastic which has been impregnated with metal or carbon.

11d. Using conductive gaskets such as "CHO-seal 1215" made by Chomerics, Inc.

The outer case 11 houses the internal components 12 which must sometimes be shielded in addition to the case. The techniques used to shield the internal components 12 are those described in 11a, 11b, 11c, and 11d above.

Figure 2:
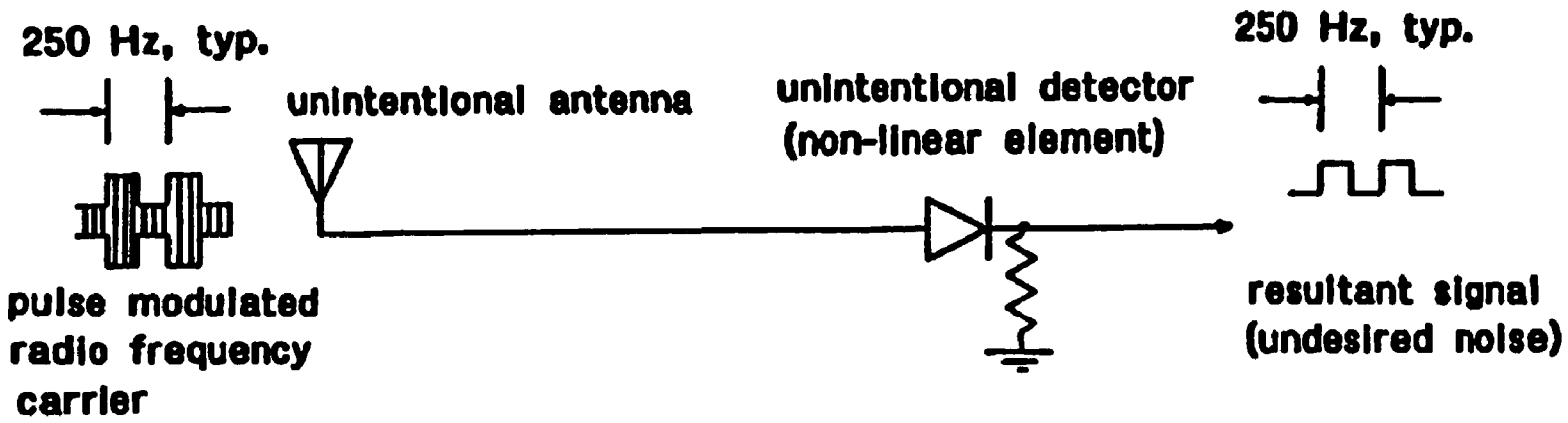
FIG. 2 shows how electromagnetic interference is transmitted by a cellular telephone, is received by an internal wire of the hearing aid which acts as an unintentional antenna, is detected and demodulated by a nonlinear element of the hearing aid (for example, a transistor), and results in a loud, audible signal which is annoying or intolerable to the hearing aid wearer.
Figure 3:
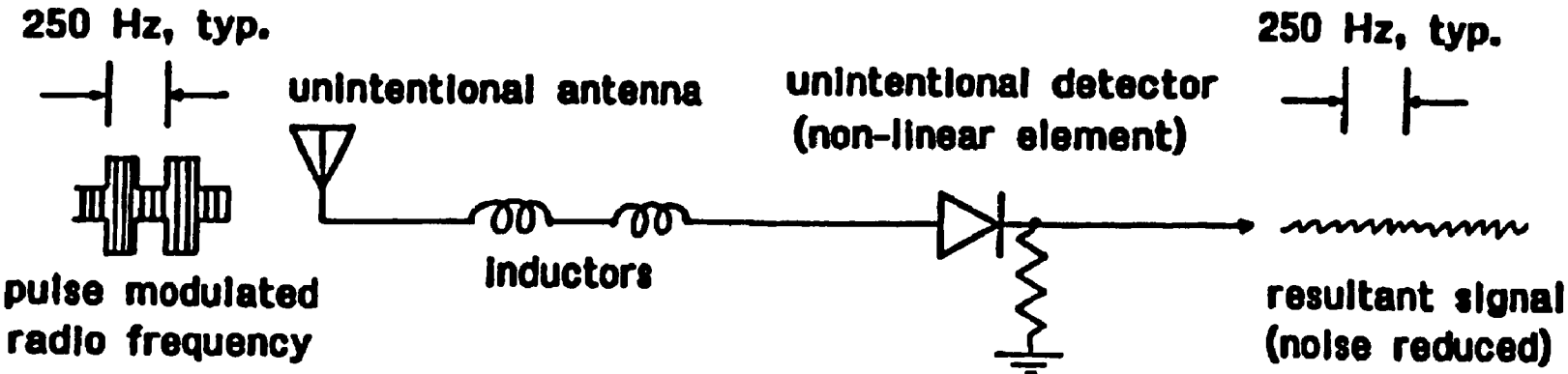
FIG. 3 Shows how the electromagnetic interference can be reduced or eliminated by adding one or more inductors in series with the internal wire which acts as an unintentional antenna. Ferrite beads can also be used in place of the inductors shown.

The internal components 12 of the hearing aid must also be sometimes modified so that the 800 MHz-100 GHz radio signals produced by cellular telephones and other devices cannot pass effectively from one component to another. This is done in such a way that the normal functions of the hearing aid are not adversely affected. Some or all of the following techniques are employed:

12a: The addition of one or more inductors 13 in series. FIG. 2 depicts a pulse modulated radio signal such as those produced by some cellular telephones. This signal is unintentionally picked up by an internal wire, acting as an unintentional antenna. The signal is then demodulated and detected by one of the nonlinear elements of the hearing aid, such as the audio amplifier. As shown in FIG. 3, by adding one or more inductors in series with the unintentional antenna, the incoming radio signal is blocked by the high impedance of the inductors. The inductors present a low impedance to the intended audio signals, which pass through intact.

Figure 1:
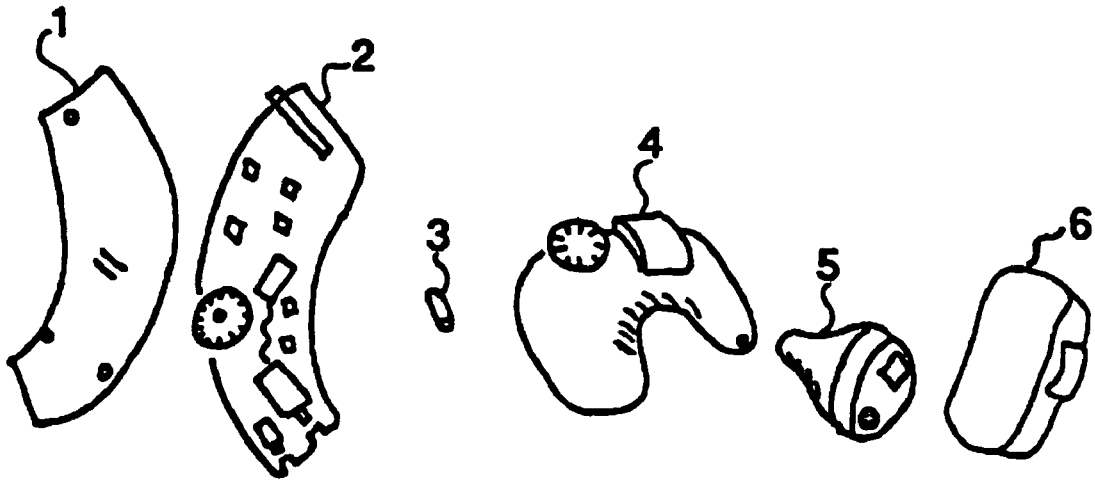
FIG. 1 (Prior Art)
FIG. 1 (Prior Art) shows a Behind The Ear hearing aid 1 and 2, an In The Ear hearing aid 4, In The Canal hearing aids 5 & 6 and a miniature ferrite bead 3 which can be used in this invention. The Completely In The Canal hearing aid is not shown.

12b: The Addition of Ferrite beads 14: Ferrite beads, such as model #2673008501 made by Fair-Rite Inc. of Wallkill, N.Y. and depicted as item #3 in FIG. 1, when slipped over an internal wire effectively add an inductor in series as described in 12a above. Other shapes of the Ferrite material, such as toroids, rods, and custom molded shapes may be used.

Figure 4:
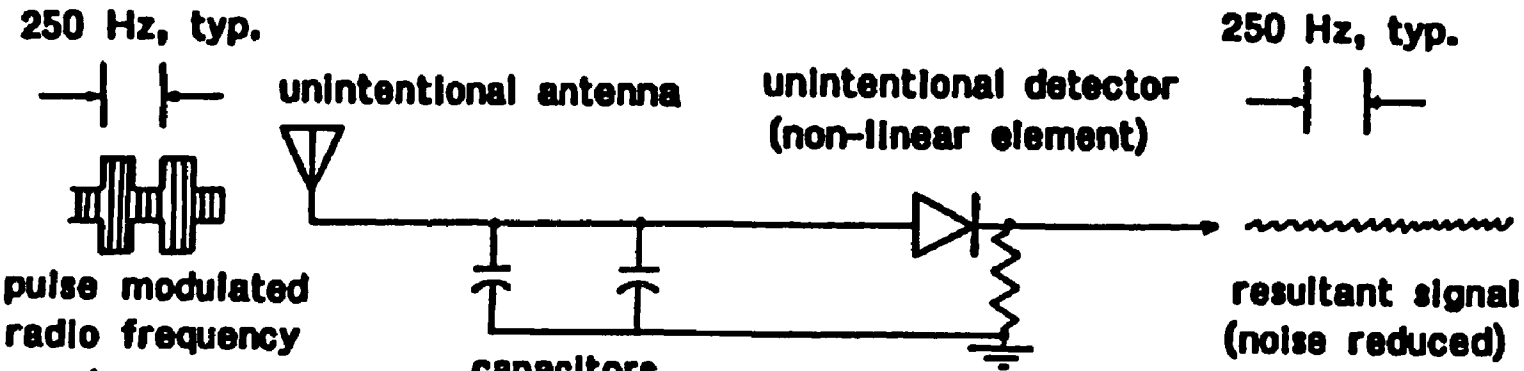
FIG. 4 shows how the electromagnetic interference can be reduced or eliminated by adding one or more capacitors in parallel with the internal wire which acts as an unintentional antenna.
Figure 5:
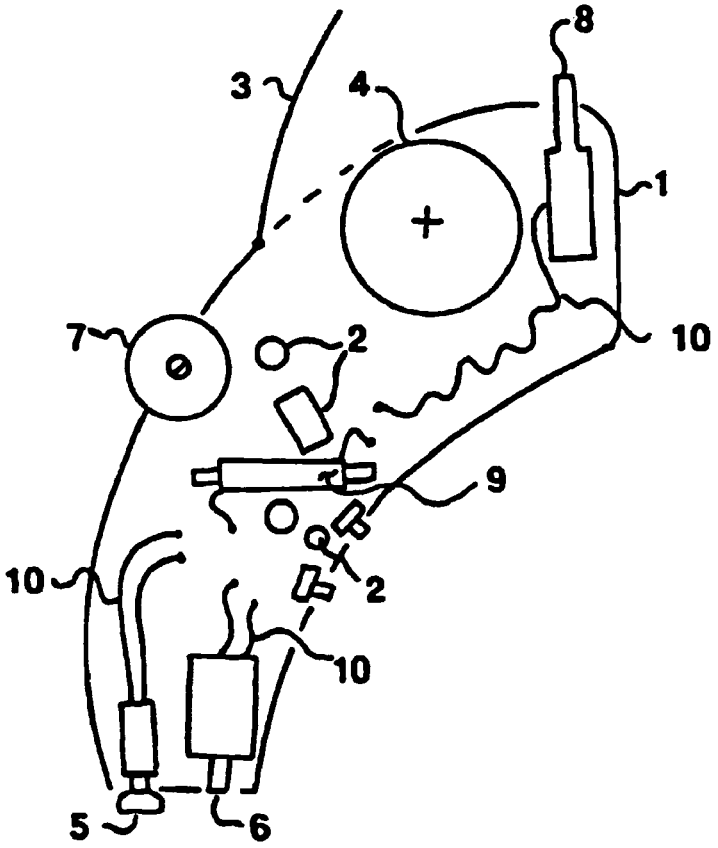
FIG. 5 (Prior Art)
FIG. 5. (Prior Art) mechanically and schematically illustrates the elements which comprise a hearing aid. A Behind The Ear hearing aid is used for the illustration, but the same elements apply to In The Ear, In The Canal, and Completely In The Canal hearing aids, the only difference being one of size and shape.
Figure 5:
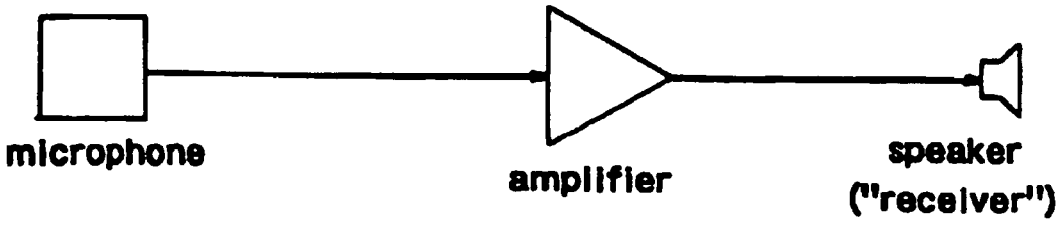
FIG. 5 (Prior Art)

12c: The addition of one or more capacitors in parallel: As shown in FIG. 4, the addition of one or more capacitors in parallel with the unintentional antenna has the same de-coupling effect as the addition of inductors in series. In this case, the capacitors present a very low impedance to the radio signal, shorting it to ground.

The capacitors present a high impedance to the audio signals, which pass through intact.

Figure 6:
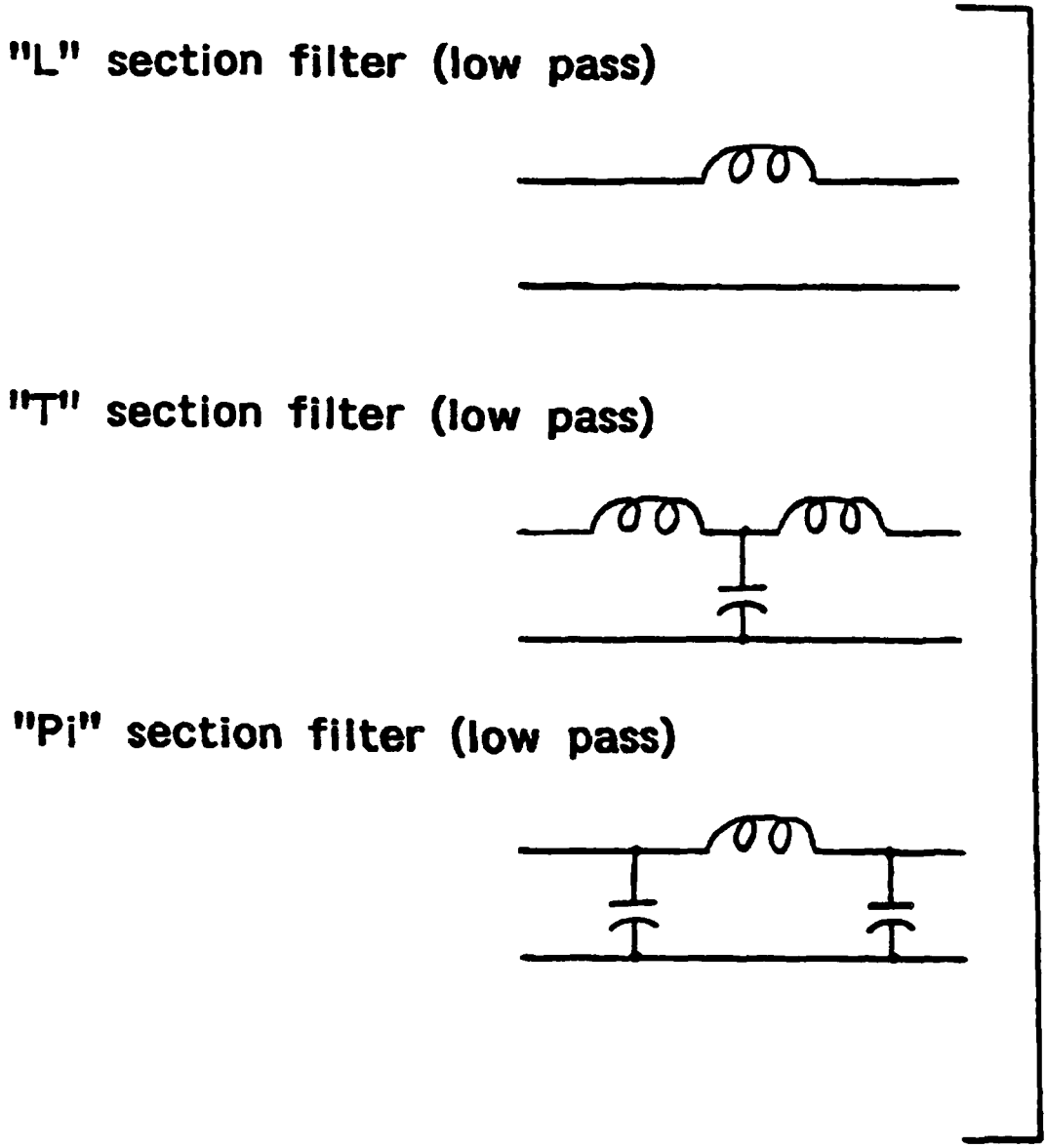
FIG. 6 (Prior Art)
FIG. 6 (Prior Art) Illustrates various ways in which inductors and capacitors can be arranged to form low-pass filters. Ferrite beads can be used in place of the inductors shown.

12d: Filtering: This consists of adding combinations of inductors (including ferrites) and capacitors as described in FIG. 6.

22: As shown in FIG. 8, an electromagnetically shielded hearing aid worn in the ear, that is an ITE, ITC or CIC hearing aid, consisting of a face plate 81 which may contain one or more controls 82, a microphone opening 83, and a battery door 84; and a shell 85, all made wholly or partially of an electrically conductive material, the shell 85 being molded to fit in the ear, or partially in the ear canal, or completely in the ear canal, and the outside of which is made of or covered by a material such as acrylic, which produces no adverse effects when worn in the ear by most people.

The face plate 81 is also made wholly or partially of an electrically conductive material, or covered by a conductive material, and its perimeter is cut so as to be congruent with the perimeter 86 of the opening of the shell, and to fit over it forming the case of the hearing aid as shown in FIG. 9.

The face plate 81 and the shell 85 are bonded mechanically and their conductive surfaces are bonded electrically. This can be done by using an electrically conductive adhesive, or any combination of conductive and non-conductive adhesives and one or more conductive gaskets. To prevent allergic reactions or other adverse effects, the electrical bonding is done in such a way that neither the conductive adhesive nor the conductive gasket will come in contact with the ear when the hearing aid is properly worn. One way to accomplish this is to cover the inside of the shell with conductive paint. This paint will also cover the perimeter 86 of the shell's opening. A conductive adhesive is applied to this perimeter, and the conductive part of the face plate is attached on top of this conductive perimeter. When the adhesive hardens, the conductive perimeter is buffed to a smooth finish.

If any conductive material remains accessible to the ear, it will be covered by a coating of a material such as acrylic, which produces no adverse effects when worn in the ear by most people. The face plate, most of which does not come in contact with the ear, can be made entirely of a conductive material or also coated with a material which produces no adverse effects when worn in the ear by most people.

Because the door of battery compartment can be a major opening through which radio signals can leak in, the door must be made partially or completely of a conductive material, and designed in such a way as to provide an electrical bond with the face plate. One way to do this is to design the door to be a threaded cap, like the top of a thermos bottle. Another way is to design the door to completely cover the opening, like the lid of a toilet seat, and using a conductive gasket to provide an effective electromagnetic shield.

Yet another way is to use a standard hearing aid battery door, and to cover it with a disposable strip of conductive tape which uses a conductive adhesive. For cosmetic reasons, the surface of this conductive tape can be dyed or painted to match the color of the hearing aid.

Hearing aids range from simple audio amplifiers to complex devices employing digital signal processing techniques. Each design presents a slightly different problem and some or all of the above protection techniques will be used. Because of the many openings that a hearing aid must have, it is impossible to shield its outer case 11 completely. The high field strengths and Ultra-High Frequencies produced by cellular telephones may require a combination of the above techniques.

The preferred embodiments are described in claims 1 and 4.

The resultant hearing aid will be unaffected by the radio signals produced by cellular telephones, allowing hearing impaired people to take advantage of cellular telephones and other personal communication devices while wearing their hearing aids.

What is claimed is

1. [An In The Ear, All in The Ear, In The Canal or Completely In The Canal] *A* hearing aid comprising: a case, internal components, [a battery door, a battery, a microphone, a speaker a volume control, a telephone coil activation switch, a telephone coil, and internal wires;] *and electrical connections between the internal components, the hearing aid including:*

*means for making at least one of* the [internal wires are made] *electrical connections and the internal components* resistant to electromagnetic interference produced by cellular telephones in the 800 MHz to 100 GHz frequency range [by lining the case with an electrically conductive material];

one or more inductors or ferrite devices [are put] in series with [some] *at least one* of the [internal wires] *electrical connections* or *at least one of the internal* components;

one or more capacitors [are put] in parallel with [some] *at least one* of the [internal wires] *electrical connections* or *at least one of the internal* components;

*electrically conductive means for shielding at least one of* the internal components [arc shielded] *or the electrical connections* from electromagnetic interference [with electrically conductive foil, and conductive gaskets;] *produced by cellular telephones*;

the case of the hearing aid further comprising a face plate and *a* shell, [said] *the* face plate and shell being made of or covered by an electrically conductive material,

[said] *the* face plate and shell being bonded together both electrically and mechanically in such a way that none of the conductive material comes in contact with the ear when the hearing aid is worn, [and]

[said] *the* face plate having [said] *a* battery door made entirely or partially of conductive material, [and]

[said] *the* battery door being covered by a disposable strip of conductive tape, and

[said] *the* conductive tape having a conductive adhesive.

*2. A hearing aid comprising:*

*a microphone adapted to convert a first acoustical sound into an electrical signal;*

*a circuit adapted to amplify the electrical signal into an amplified electrical signal;*

*a speaker adapted to convert the amplified electrical signal into a second acoustical sound;*

*a low-pass electrical filter adapted to limit interference from interference signals from a personal communication device with at least one of the electrical signal and the amplified electrical signal so that the second acoustical sound corresponds to the first acoustical sound, said low-pass electrical filter comprising a capacitive component electrically coupled from between said microphone and said speaker to a ground and an inductive component electrically coupled between said microphone and said speaker;*

*a case made at least in part of an electrically conductive material, said case adapted to hold and protect internal components of the hearing aid, said internal components including said microphone, said circuit adapted to amplify, and said speaker; and*

*at least one electrically conductive shield shielding at least one of said internal components from interference signals from the personal communication device, said at least one electrically conductive shield being at least one of an electrically conductive coating of said case and an electrically conductive material lining said case.*

*3. The hearing aid of claim 2, wherein the electrical filter limits interference from the interference signals having a frequency of at least 800 MHz.*

*4. The hearing aid of claim 2, wherein said capacitive component of said low-pass electrical filter is adapted to bypass interference signals from the personal communication device to the ground and said inductive component of said low-pass electrical filter is adapted to inhibit interference signals from the personal communication device from passing between said microphone and said speaker.*

*5. The hearing aid of claim 2, wherein said case is one of configured to be positioned behind an ear, in the ear, completely in the ear, in an ear canal, and completely in the ear canal.*

*6. The hearing aid of claim 2, wherein said at least one electrically conductive shield comprises an electrically conductive foil.*

*7. A hearing aid comprising:*

*a microphone adapted to input a first acoustical sound;*

*a circuit adapted to amplify;*

*a speaker adapted to output a second acoustical sound;*

*a first electrical connection for transferring electrical signals from said microphone to said circuit adapted to amplify;*

*a second electrical connection for transferring electrical signals from said circuit adapted to amplify to said speaker;*

*a low-pass electrical filter electrically coupled to one of said first electrical connection and said second electrical connection, said electrical filter adapted to attenuate*

*interference signals from a personal communication device from propagating in one of said first electrical connection and said second electrical connection so that the second acoustical sound corresponds to the first acoustical sound, said low-pass electrical filter comprising at least one capacitive component electrically coupled to a ground and one of said first electrical connection and said second electrical connection, and at least one inductive component electrically coupled to the other of said first electrical connection and said second electrical connection between said microphone and said speaker;*

*a case made at least in part of an electrically conductive material to limit propagation of interference signals from the personal communication device in at least said first electrical connection and said second electrical connection, said case being adapted to hold internal components of the hearing aid; and*

*at least one electrically conductive shield shielding at least one internal component of the hearing aid, said at least one internal component including one of said microphone, said circuit adapted to amplify, and said speaker, said at least one electrically conductive shield being at least one of an electrically conductive coating of said case and an electrically conductive material lining said case.*

*8. The hearing aid of claim 7, wherein said case is one of configured to be positioned behind an ear, in the ear, completely in the ear, in an ear canal, and completely in the ear canal.*

*9. The hearing aid of claim 7, wherein said at least one electrically conductive shield comprises an electrically conductive foil.*

*10. A hearing aid comprising:*

*a microphone adapted to convert a first acoustical sound into an electrical signal;*

*a circuit adapted to amplify the electrical signal into an amplified electrical signal;*

*a speaker adapted to convert the amplified electrical signal into a second acoustical sound;*

*a first electrical connection between said microphone and said circuit adapted to amplify;*

*a second electrical connection between said circuit adapted to amplify and said speaker;*

*a low-pass electrical filter electrically coupled to one of said first electrical connection and said second electrical connection, said electrical filter including a capacitive component and an inductive component to limit interference from interference signals from a personal communication device with one of the electrical signal and the amplified electrical signal so that the second acoustical sound is an audible reproduction of the first acoustical sound, said inductive component being electrically coupled in series with at least one of said microphone and said speaker, and said capacitive component being electrically coupled in parallel with at least one of said microphone and said speaker;*

*a case made at least in part of an electrically conductive material to limit propagation of interference signals from the personal communication device in at least said first electrical connection and said second electrical connection, said case being adapted to hold internal components of the hearing aid; and*

*at least one electrically conductive shield shielding at least one internal component of the hearing aid, said at least one internal component including one of said microphone, said circuit adapted to amplify, and said speaker, said at least one electrically conductive shield being at least one of an electrically conductive coating of said case and an electrically conductive material lining said case.*

*11. The hearing aid of claim 10, wherein said case is one of configured to be positioned behind an ear, in the ear, completely in the ear, in an ear canal, and completely in the ear canal.*

*12. The hearing aid of claim 10, wherein said at least one electrically conductive shield comprises an electrically conductive foil.*

* * * * *

UNITED STATES PATENT AND TRADEMARK OFFICE

CERTIFICATE OF CORRECTION

PATENT NO. : RE43,519 E
APPLICATION NO. : 11/099518
DATED : July 17, 2012
INVENTOR(S) : Louis T. Gnecco et al.

It is certified that error appears in the above-identified patent and that said Letters Patent is hereby corrected as shown below:

On the Title Page, Item (22):
Change "Apr. 8, 2005" to -- Apr. 6, 2005 --.

Signed and Sealed this
Sixteenth Day of October, 2012

David J. Kappos

David J. Kappos
*Director of the United States Patent and Trademark Office*